July 26, 1960     R. C. MIERENDORF ET AL     2,946,959

ALTERNATING CURRENT SWITCHING CIRCUITS

Filed March 18, 1957

INVENTOR.
ROBERT C. MIERENDORF
CLARENCE W. PORTER
BY
*Myron J. Seibold*
Atty.

United States Patent Office 2,946,959
Patented July 26, 1960

2,946,959

ALTERNATING CURRENT SWITCHING CIRCUITS

Robert C. Mierendorf and Clarence W. Porter, Wauwatosa, Wis., assignors to Square D Company, Detroit, Mich., a corporation of Michigan Filed Mar. 18, 1957, Ser. No. 646,768

6 Claims. (Cl. 328—89)

The present invention relates to alternating current switching circuits and more particularly to alternating current switching circuits employing electronic switching elements.

Generally, the invention is directed to a class of alternating current switching elements including a pair of electronic devices or tubes connected in inverse parallel and in series with the load to an A.C. supply source wherein a switching signal is applied to the input of one of the tubes called the lead tube for controlling the switching operation. The trail tube should follow the conductance of the lead tube on respective alternate half cycles wherein each half cycle or partial half cycle of the lead tube is followed by a half cycle of conduction by the trail tube and each complete half cycle of nonconduction by the lead tube is followed by a complete half cycle of nonconduction of the trail tube.

Prior art methods of alternating current switching circuits depended on various methods of transformer coupling from the load to the grid of a trial tube in an inverse parallel arrangement of tubes acting as an alternating current switch. Generally, these methods include a power transformer winding for providing holdoff bias for the trial tube and a pulsing transformer coupling a signal from the load to the grid of the trial tube for turning the tube on wherein the signal in the pulsing transformer is derived from a current in the load resulting from conduction of the lead tube. The prior art transformer coupling methods have been found to be unreliable if the load is highly inductive or has a low power factor, and otherwise disadvantageous due to the cost and size of the coupling transformers increasing the cost and size of the switching unit.

The present invention is directed to an alternating current switching system using electronic switching elements in inverse parallel arrangement but performing the switching operation more satisfactorily than prior art devices under all conditions and more particularly, for any type of load, i.e., inductive, capacitive or resistive, or any combination thereof. A further advantage of the present invention is the elimination of transformer coupling, thereby decreasing the cost and size of the switching unit. It is an object therefore of the present invention to provide an alternating current switching system having the foregoing features and advantages.

Another object is the provision of an alternating current switching circuit for various types of output loads.

A further object of the invention is to provide an alternating current switch employing electronic tubes connected in inverse parallel in which one tube controls the conductance of the other tube.

Still another object is the provision of a grid biasing circuit in an electronic switching circuit for controlling one switching tube in a pair directly from the other tube.

Further objects and features of the invention will be readily apparent to those skilled in the art from the specification and appended drawings illustrating certain preferred embodiments in which.

Figure 1:
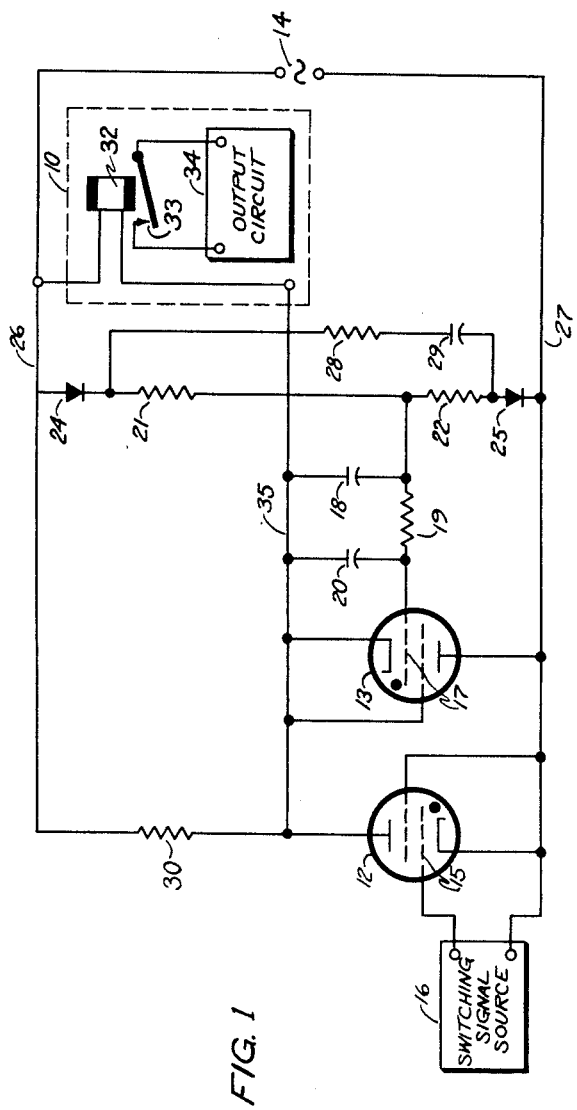
Fig. 1 is a circuit diagram of a preferred embodiment of the present invention.

Referring now to the drawings, there is shown in Fig. 1 which illustrates a preferred embodiment, an alternating current circuit including an alternating current switching arrangement for controlling the power applied to an alternating current load 10 in which a pair of grid controlled gaseous discharge devices or thyratrons 12 and 13 are connected in inverse parallel and in series with a relay coil or other load to an alternating current power source 14. The lead tube or device 12 is controlled by a switching signal coupled to its control grid 15 from the switching signal source 16 connected across the lead tube input. The trail tube or device 13 is connected in the circuit and to the lead tube 12 to follow the conductance of the lead tube on immediate subsequent alternate half cycles of the alternating current voltage supplied from the alternating current source.

The circuit for supplying a holdoff and turn on voltage to the trail tube 13 includes means for detecting the condition of conductance of the lead tube 12 to control the grid bias of the trail tube 13 and thereby follow the lead tube.

More particularly, the grid signal of the trail tube is derived from a circuit connected across the lead tube and load and coupled to the grid 17 of the trail tube 13. The preferred arrangement of the grid signal coupling circuit includes a capacitor 18 connecting the anode of the lead tube 12 to the grid 17 of the trail tube 13 through series grid resistor 19 and grid filtering capacitor 20 connected across the input of the trail tube 13.

The trail tube bias supply source broadly includes resistor elements 21 and 22 in series connected across the alternating current supply source 14 and unidirectional conducting devices or rectifiers 24 and 25 on either side of the voltage divider permitting current flow from supply line 26 to other supply line 27. A bias voltage filter circuit includes a current limiting resistor 28 and filter capacitor 29 in series connected across the bias supply voltage divider. The arrangement of the rectifiers 24 and 25 to provide a lead tube condition of conductance detector circuit including the load resistor 30 will be explained more fully in the description of operation.

The exemplary load 10 is shown as a relay 32 having contacts 33 completing an output circuit 34 wherein the relay winding is connected between the line 35 and supply line 26 and in series with the switching tubes 12 and 13. It should be understood that any load or device may be connected directly in series with the switching tubes within the maximum output capacity of the tubes or if the output of the switching circuit is too low, any suitable means may be used to amplify the output to increase it to the required input of the load circuit.

*Operation*

Figure 2:
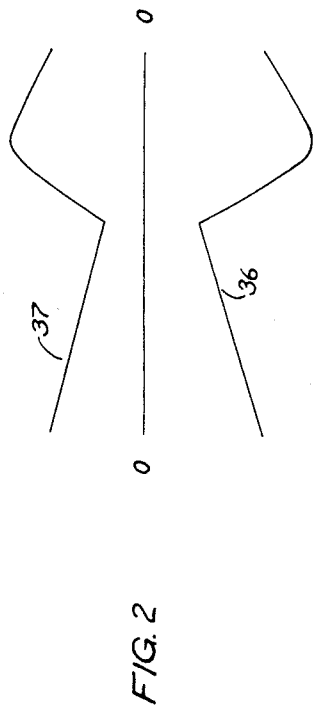
Fig. 2 illustrates typical grid biasing signal voltages applied to the trial tube.

Assuming the grid signal applied to the lead tube 12 from the switching source 16 biases it to hold off conduction during the positive half cycle of the supply voltage 14, a trail tube grid signal 36 as shown in Fig. 2 is produced by the charging of capacitor 18 which provides a negative or hold-off voltage through a current charging path including load resistor 30, capacitor 18, resistor 22 of voltage divider and rectifier 25 connecting supply line 26 to the other supply line 27. Rectifier 25 blocks this path during the subsequent alternate half cycle or half cycle the supply voltage is positive on the anode of tube 13.

If the switching signal turns the lead tube on during the half cycle or partial half cycle of positive voltage on the lead tube anode, the bias circuit produces a positive grid voltage signal 37 as shown in Fig. 2 and capacitor 18 is charged positively which is stored in turn on the trail tube during its respective succeeding positive half cycle. During periods of conduction of the lead tube, load resistor 30 in the lead tube anode supply circuit lowers the anode voltage of the lead tube and the capacitor charges positively through the capacitor charging circuit including rectifier 24, resistor 21 of the voltage divider, capacitor 18 and lead tube 12, completing the circuit across the supply source 14.

Positive voltage on the trail tube resulting when supply line 27 is positive with respect to supply line 26 limits the discharge of capacitor 18 wherein both rectifiers 24 and 25 are blocking to retain adequate holdoff or turn on voltage on the grid of the trail tube over the entire period of its respective alternate half cycle.

Thus the switching circuit completes the switching operation over the complete cycle of alternating current to a series load 10 by a switching signal controlling the lead tube 12 only and the lead tube in turn controls the trail tube 13 in accordance with its condition of conductance through the detector circuit coupled to the trail tube.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an alternating current switching circuit, the combination comprising; a pair of gaseous discharge devices consisting of a lead device and a trail device connected in inverse parallel in series circuit with a load and an alternating current source, each of said devices having a control means for controlling the conduction of said devices, means connected to the control means for controlling the conduction of the lead device and means including a capacitor connected to the control means of the trail device and the series circuit to have a charge of one polarity impressed thereon for continuously biasing the trail device against conduction whenever the lead device is non conductive and having a charge of reversed polarity impressed thereon for continuously biasing the trail device to conduction over the entire half cycle following the preceding half cycle conduction of the lead device.

2. In an alternating current switching circuit, the combination comprising; a pair of grid controlled gaseous discharge devices consisting of a lead device and a trail device each having an anode connected in inverse parallel between a source of alternating current and a load, means connected to the grid of the lead device for selectively controlling the conductance of the lead device in respective alternate half cycles in accordance with a switch operation, a capacitor having its terminals connected between the grid of the trail device and the anode of the lead device for controlling the conduction of the trail device, and a circuit means unaffected by the conduction of the trail device and responsive to the conduction of the lead device and arranged for charging the capacitor with one polarity which will render the trail device non conductive during period when neither of the devices are conductive and for charging the capacitor with an opposite polarity during the half cycle conduction of the lead device whereby the trail device is rendered conductive during the succeeding half cycle.

3. In an alternating current switching circuit the combination comprising; a pair of grid controlled gaseous discharge devices having anodes connected in inverse parallel between a source and a load, a pair of unidirectional conducting devices connected in series across the source, means connected to the grid of one of the gaseous devices for controlling the conduction of the device, and means including a capacitor having a terminal connected to the anode of the one gaseous device and a second terminal connected to the grid of the other device and to a junction between the unidirectional conducting devices whereby the capacitor is charged to one polarity through one of the unidirectional devices when the said one tube is non conductive and to the opposite polarity through the other unidirectional device when the said one device is conductive.

4. In an alternating current switching circuit, the combination comprising; a pair of switching devices each having a control electrode and principal electrodes connected in inverse parallel between an alternating current source and a load, a pair of unidirectional conducting elements connected in series across the source, means connected to the control electrode of one of the devices for controlling the conduction of the said one device, means responsive to the conduction of the said one device for controlling the conduction of the other device, said last mentioned means comprising; a capacitor having one terminal connected to one of the principal electrodes of the said one device and its other terminal connected to the control electrode of the other device and to a junction between the unidirectional conducting elements.

5. The combination as recited in claim 4 wherein the capacitor is charged to one polarity when neither of the devices are conducting and wherein the capacitor is charged to the opposite polarity when the one device is rendered conductive and maintains its charge throughout the period of conduction of the other device.

6. In an alternating current switching circuit, the combination comprising; a lead and a trail switching device each having a control electrode and a pair of principal electrodes connected in inverse parallel between an alternating current source and a load, means connected to the control electrode of the lead device for controlling the conductivity of the lead device, a capacitor connected to one of the principal electrodes of the lead device and to the control electrode of the trail device, and circuit means arranged to charge the capacitor with one polarity from the source when the lead device is non conductive and for reversing the charge on the capacitor when the lead device is conductive, said capacitor being connected to the control electrode and one of the principal electrodes of the trail device for controlling the conduction of the trail device and said last mentioned means being unaffected by the conduction of the trail device.

References Cited in the file of this patent

UNITED STATES PATENTS

| | | |
|---|---|---|
| 1,970,515 | Lord | Aug. 14, 1934 |
| 1,995,810 | Klemperer | Mar. 26, 1935 |
| 2,126,398 | Knowles | Aug. 9, 1938 |
| 2,220,151 | Gulliksen | Nov. 5, 1940 |
| 2,270,799 | Gulliksen | Jan. 20, 1942 |
| 2,368,477 | Kinsman | Jan. 30, 1945 |